United States Patent Office 3,444,554
Patented May 13, 1969

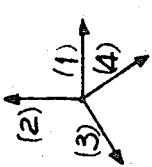
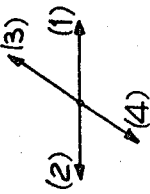
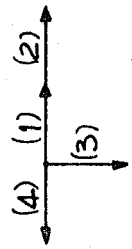
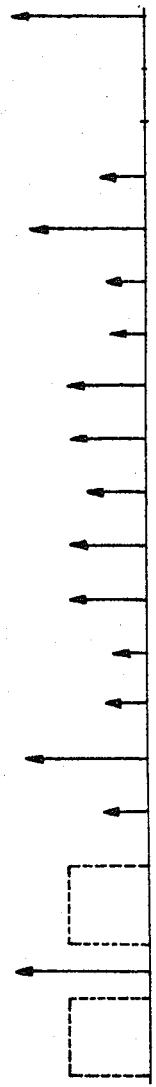
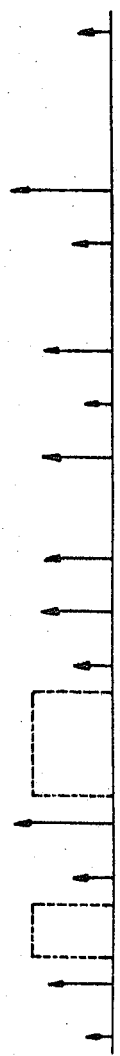
Fig. 8　Fig. 10　Fig. 11

3,444,554
ARRANGEMENTS FOR ELIMINATING
FIXED ECHOES
Roland Carre, Paris, France, assignor to CSF-Compagnie Generale de Telegraphie Sans Fil, a corporation of France
Filed Apr. 11, 1968, Ser. No. 720,638
Claims priority, application France, Apr. 21, 1967, 103,750
Int. Cl. G01s 9/42
U.S. Cl. 343—7.7                                                 5 Claims

ABSTRACT OF THE DISCLOSURE

In order to avoid the spreading of the spectrum of the fixed echoes in pulsed radar systems with wobbulated repetition frequency, an additional modulation, either a phase or an amplitude modulation, is carried out either at the transmission or at the reception, the modulation law being a function of the wobbulation law.

---

The present invention relates to pulsed radars with repetition frequency modulation.

It is known that the repetition frequency of pulsed radars is wobbulated in order to avoid, in the receivers of the so called M.T.I. type, the suppression of the echoes of moving targets whose speed is such that the coherent phase of the corresponding echo varies by $\pi$ during one repetition period of the radar.

However, the wobbulation of the repetition frequency has, on the other hand, the effect of spreading the spectrum of the fixed echoes. In high-power M.T.I. radar receivers, for example of the so-called "range gate filter" type, these spectrums fall therefore within the domain covered by the Doppler filters: the total suppression of the echoes of fixed target is no longer possible and this reduces the efficiency of the system.

According to the invention, this drawback is eliminated by using an additional modulation either of the amplitude or of the phase, either at the transmission or at the reception.

For given conditions of utilization, the system with supplementary modulation according to the invention may function on a smaller wavelength than the simply wobbulated repetition frequency system, which results in the advantage that a smaller antenna with better conditions for detecting targets at low altitude can be used, which targets are usually confused with fixed targets.

According to the invention there is provided a method for improving a pulsed radar system with wobbulated pulse repetition frequency, said method consisting substantially in applying an additional modulation, according to a modulation law such that at least the first line of the spectrum caused by the wobbulation is cancelled.

Figure 1:
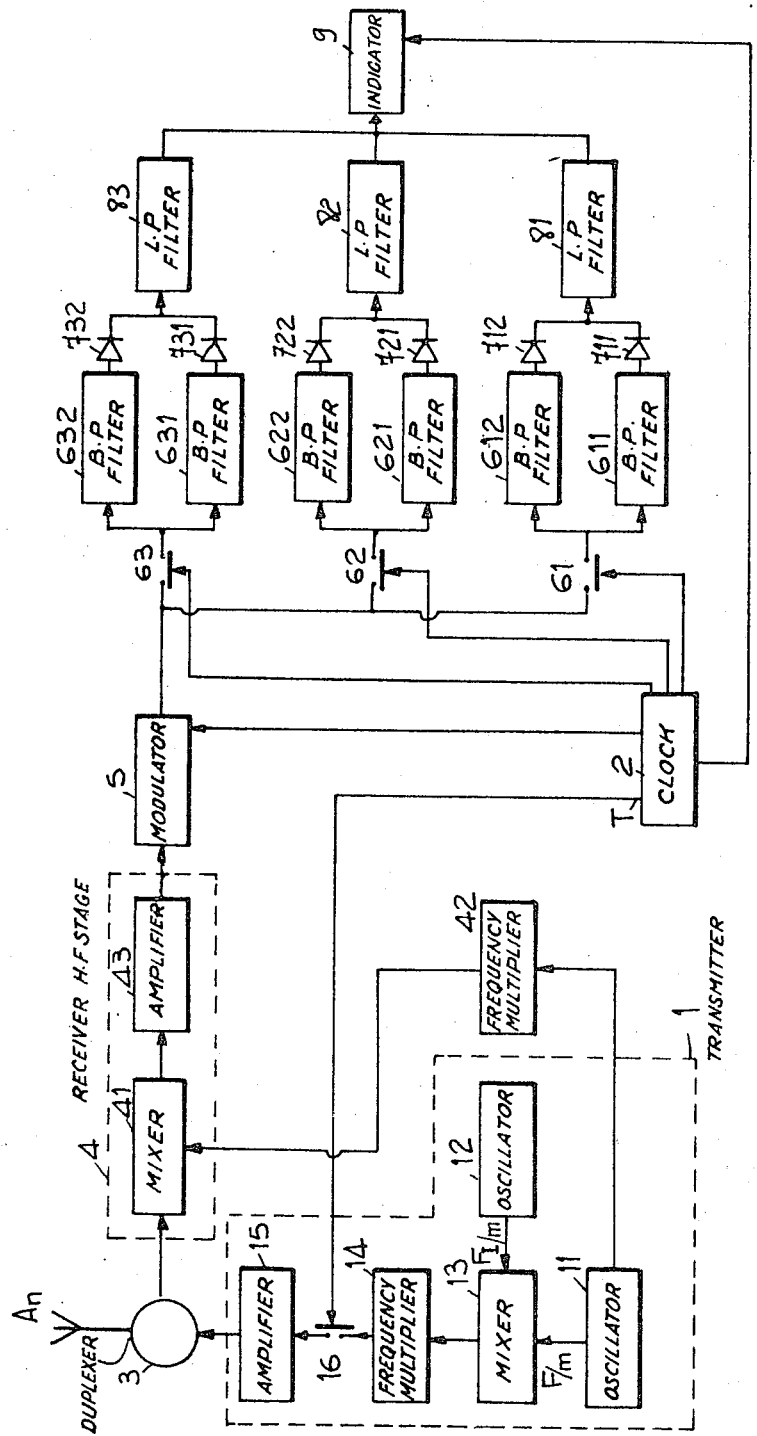
Figure 2:
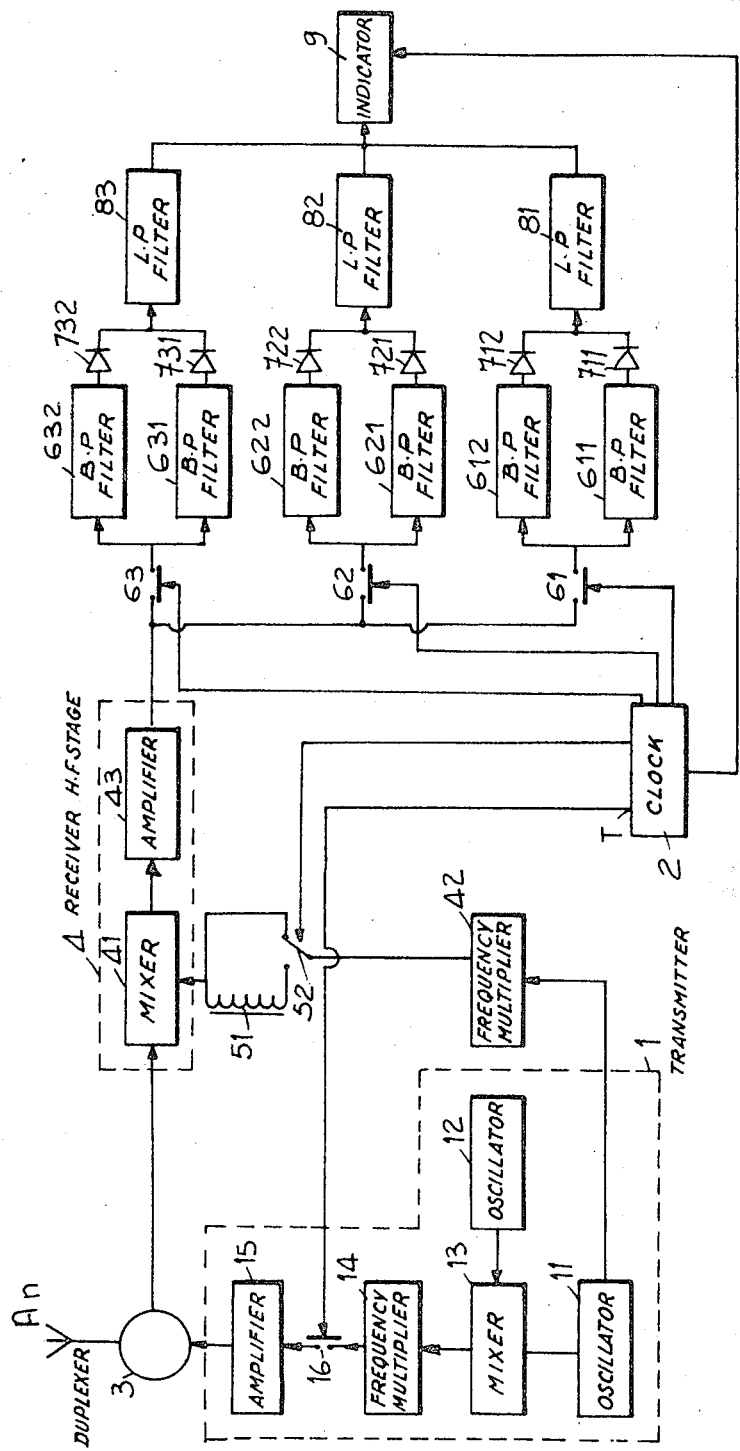
Figure 3:
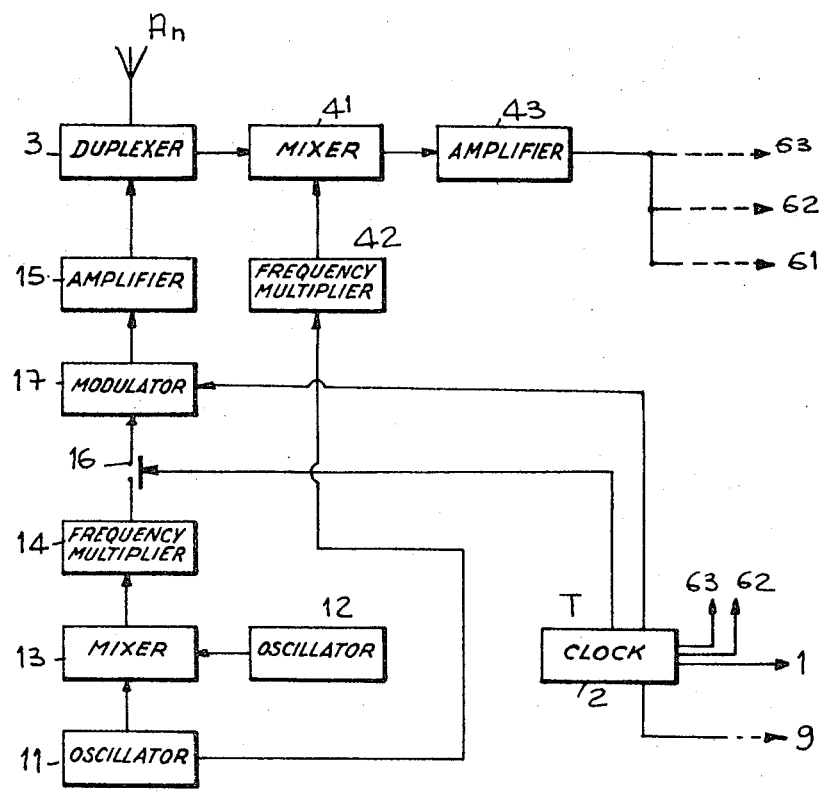

For a better understanding of the invention and to show how the same may be carried into effect, reference will be made to the drawings accompanying the following description and in which:

FIGS. 1, 2 and 3 are non-limitative examples of a radar system improved according to the invention; and FIGS. 4 to 11 are explanatory graphs.

In the radar system of FIGS. 1 and 2, the additional modulation according to the invention is effected in the receiver. The modulation is an amplitude modulation in FIG. 1 and a phase modulation in FIG. 2.

In the radar shown in FIG. 3, the additional modulation is carried out at the transmitter. For technical reasons, phase modulation will be preferred in this instance.

The transmitters 1, of the radar systems shown in FIGS. 1 and 2, differ in no way from conventional wobbulated pulse radar transmitters; the transmission is synchronized by a timer 2 having an output T. A duplexer 3, which is self controlled or controlled by the timer 2, connects alternately the antenna $A_n$ with the transmitter 1 or with a conventional high and intermediate frequency stage 4 of the receiver. For example, the transmitter E comprises two oscillators 11 and 12 with frequencies $F/m$ and $F_I/m$, where $F_I$ is the intermediate frequency of the receiver, a single sideband mixer 13, a frequency multiplier by $m$, 14, and a high frequency amplifier 15 connected to the output of the multiplier.

The pulse modulator, diagrammatically shown at 16, is controlled by the timer 2.

The echoes received with a carrier frequency $F+F_I+fd$, where $fd$ is the Doppler frequency of the target, are translated to the frequency $F_I+fd$ in the single-sideband mixer 41 which receives the wave with the frequency F, derived from the oscillator 11, with the frequency $F/m$, through a frequency multiplier at 42.

The echo with the intermediate frequency $F_I+fd$ is amplified in an amplifier 43.

Of course, the transmitter 1 and the stage 4 of the receiver can be constructed in any other known manner, it being only necessary that the intermediate frequency echo at the output of the stage 43 should be a "coherent" echo, as is the case in the examples given, where the intermediate frequency wave is obtained from a wave with the frequency $F/m$ of the transmitter.

In the embodiment of FIG. 1, the coherent echo at the intermediate frequency is amplitude modulated in a modulator 5, which is for example a controlled variable gain amplifier, whose gain varies from one recurrence to the next; to this end, the modulator 5 is also controlled by the clock 2.

In the embodiment shown in FIG. 2, phase modulation has been used. Therefore a phase amplitude modulator can be substituted for the amplitude modulator of FIG. 1.

However, as shown in FIG. 2, it is preferred to carry out this modulation on the local wave used for the frequency change whose spectrum is narrower than that of the signal.

To this end, the output of the frequency multiplier 42, which supplies the coherent wave used for the frequency change of the echo, is connected to a phase modulator, controlled by the timer 2. The phase modulator may be for example, in the case of a modulation by all or nothing, an inductance coil 51 introducing, at the frequency considered, a phase shift of 30°, associated with a switch 52 controlled by the timer and which, according to its position, places the coil 51 in series between the output of the multiplier 42 and the associated input of the mixer 41, or switches it out.

The modulator 5 in FIG. 1 and the amplifier 43 in FIG. 2 are followed by a circuit comprising in a conventional manner $n$ channels which are selected by means of circuits, diagrammatically shown as $n$ switches 61, 62 and 63, $n$ having been limited to three by way of example. The switches are sequentially operated by the timer 2. Each channel comprises two bandpass-filters in parallel, 611–612, 621–622 and 631–632, with the same bandwidths.

It will be explained further below how the centre frequencies of the filters are selected according to the type of modulation used.

Figure 4:
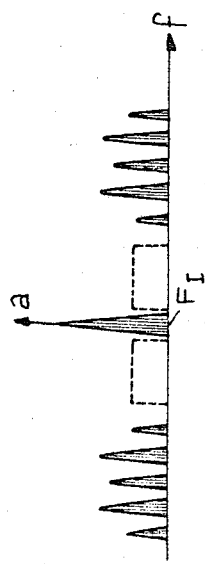

For a modulation and a wobbulation which are correctly connected to each other as will be defined below, the frequency spectrum at the input of the filters has the shape shown in FIG. 4, where the frequency $f$ is plotted along the abscissae and the amplitude of the lines of the signal spectrum along the ordinates and in dotted lines, the theoretical filter characteristics. It can be seen that the two filters deliver no signal, if the centre frequency is equal to $F_I$, i.e., during the reception of echoes from fixed targets.

On the other hand, for echoes from mobile targets, the spectrum is offset, its centre frequency being $F_I + fd$, where $fd$ is the Doppler frequency, and the filters pass the echo.

The output of the filters is used in a conventional manner: a detection of the envelope is carried out at the output of each filter in the detectors 711–712, 721–722 and 731–732.

The output signals of the two detectors of each channel are then added and a video integration is made by a low-pass filter 81, 82 and 83. The outputs of the filters are connected directly to the signal input of a panoramic indicator 9 synchronized by the transmission, or may supply, as known per se, a sampling device for creating a synthetic radar video signal.

The additional modulation may also be effected in the transmitter. In this case, the receiver is not modified, but the transmitter comprises a modulator 17 placed after the amplifier, as shown in FIG. 3.

Basically, the modulation may be effected either at the transmitter or at the receiver. However, in so far as the amplitude modulation is concerned, it would be preferable theoretically to carry this out at the transmitter because the amplitude ratio between signal and noise at the receiver end then would not be modulated. However, in the present state of the technique it is not easy to carry out the amplitude modulation at the transmitter, in view of the powers used, and where the modulation is to be effected at the transmitting end, a phase modulation is used for purely technological reasons.

However, the phase modulation permits only the annulation of a single parasitic line and must only be used where the wobbulation does not introduce more than one parasitic line into the spectrum between the frequency of the continuous component and a frequency equal to one half of the original repetition frequency.

FIGS. 5 to 11 show, by way of practical examples, the effects of the additional modulation according to the invention.

Figure 5:
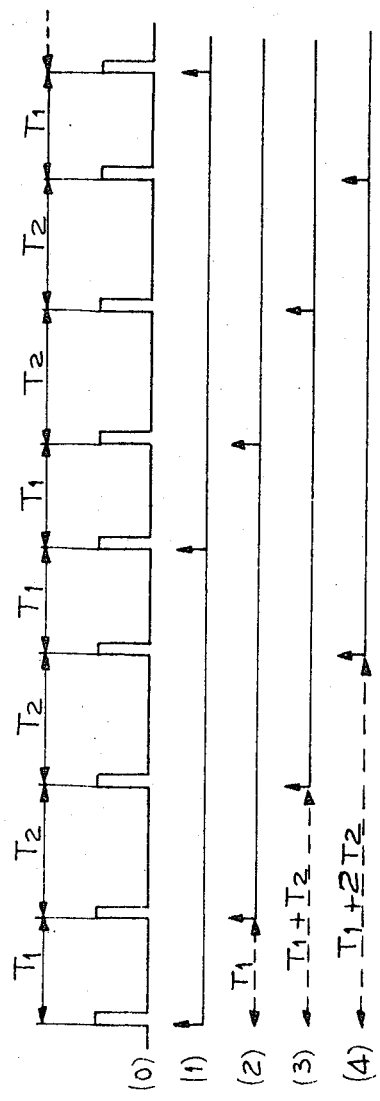

For the sake of clarity, it will first be assumed that the wobbulation of the repetition frequency of the radar pulses follows a recurrent law; for example, the intervals between the transmission constants are $T_1$, $T_2$, $T_2$, $T_1$, $T_1$, $T_2$, $T_2$, $T_1$ ... as shown in FIG. 5 at (a), where the abscissa shows the time and the ordinate the transmitted pulses.

The frequency spectrum of these pulses can be decomposed as follows:

A continuous wave with the carrier frequency $Fo$;
A modulation function conforming to the curve (0).

The modulation function can be decomposed in four functions, having the same repetition period equal to $2(T_1+T_2)$, which are identical but whose respective origins are shifted with respect to each other. Taking one of these functions as a reference, the relative shifts of the other three are, respectively, $T_1$, $T_1+T_2$ and $T_1+2T_2$. The frequency spectra of these four functions are identical in amplitude but their lines are phase shifted, as indicated at (1), (2), (3), (4) in FIG. 5.

Taking the unity as amplitude for each elementary spectrum, the continuous component of the total spectrum has an amplitude equal to four.

The amplitude of the first line of the resulting spectrum is equal to that of the vectorial sum of the first lines of each elementary spectrum. Its frequency is $$\frac{(T_1+T_2)}{2}$$

The phase shifts $\theta$ of the lines are respectively:

Elementary spectrum 1 (reference)

$$\theta 11 = 0$$

Elementary spectrum 2

$$\theta 12 = \frac{2\pi T_1}{2(T_1+T_2)} = \theta$$

Elementary spectrum 3

$$\theta 13 = \frac{2\pi(T_1+T_2)}{2(T_1+T_2)} = \pi$$

Elementary spectrum 4

$$\theta 14 = \frac{2\pi(T_1+2T_2)}{2(T_1+T_2)} = 2\pi - \theta$$

Figure 6:
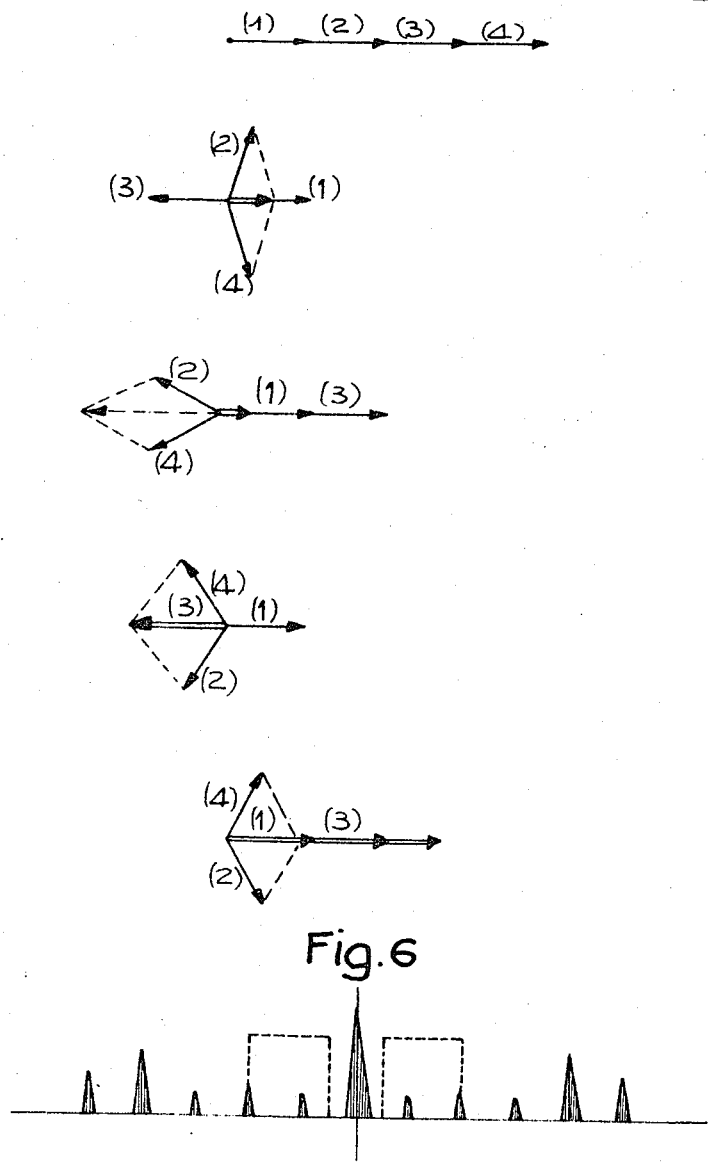

Similarly, for the second line of the spectrum:

$\theta_{2.1}=0$, $\theta_{2.2}=2\theta$, $\theta_{2.3}=2\pi$, and $\theta_{2.4}=4\pi-2\theta$ and for the $p^{th}$ line $\theta_{p.1}=0$, $\theta_{p.2}=p\theta$, $\theta_{p.3}=2.\pi$, and $\theta_{p.4}=p(2\pi-\theta)$ FIG. 6 shows the vectorial compositions of the signals for the line zero and the lines 1 to 4, from top to bottom, the resultant being shown in double lines.

The spectra of echoes received from fixed targets differ from the transmitted signal only by the amplitude modulation due to the rotation of the antenna, having the effect of transforming each line in a narrow triangular spectrum.

Figure 7:

Thus the wobbulation has added to the spectrum of fixed echo for a constant repetition frequency $$FR = \frac{T_1+T_2}{2}$$

parasitic spectra at the frequencies FR/4, FR/3 and 3 FR/4, as shown in FIG. 7.

These spectra give rise to signals which are picked up by the filters of the receiver as shown in FIG. 7.

The correcting amplitude modulation according to the invention is so chosen as to modify the amplitude of each elementary function so that the first two parasitic lines, i.e., those in the pass band of the filter, are cancelled.

Let $x_1$, $x_2$, $x_3$, $x_4$ be the amplitudes of the four functions with $x_2=x_4$ by symmetry, the condition for the cancellation is:

For the 1st line: $x_1-x_3+2x_2\cos\theta=0$
For the 2nd line: $x_1+x_3+2x_2\cos2\theta=0$
from which it follows that:

$$\frac{x_2}{x_1}=\frac{1}{\cos\theta+\cos 2\theta} \text{ and } \frac{x_3}{x_2}=\cos\theta-\cos 2\theta$$

In the example of FIG. 5, $$\frac{T_2}{T_1}=\frac{5}{4}$$

from which it follows that:

$$\theta=\frac{2\pi T_1}{2(T_1-T_2)}=\frac{4\pi}{9}, \text{ i.e., } 80°$$

and it is found that:

$$\frac{x_2}{x_1}=1.3 \text{ and } \frac{x_3}{x_2}=1.115, \text{ i.e., } \frac{x_3}{x_1}=1.45$$

These coefficients are accordingly utilized for the amplitude modulation either at the transmitter or at the receiver.

The spectrum calculated by making the vectorial sum of the four elementary spectra is, in this example, and under the assumption that $\varphi = 90°$ $\theta$:

lines: 0–4–8–12 ........................ $2.45 + 2.6\cos N\varphi$
lines: 1–5–9–13 ........................ $0.45 + 2.6\sin N\varphi$
lines: 2–6–10 .......................... $2.45 - 2.6\cos N\varphi$
lines: 3–7–11 .......................... $0.45 - 2.6\sin N\varphi$ The lines of this spectrum are shown in FIG. 8 together with the filter bands. For moving targets, the spectrum is identical but offset relative to the characteristic of the filter by the Doppler frequency.

The powers of the lines picked up are added conventionally for supplying the useful signal.

It is, of course, possible to use more complicated, but always symmetrical functions. It is possible in this way to cancel parasitic lines up to the centre of the mean repetition frequency FR.

As to the phase modulation it makes it possible to cancel only a single parasitic line. It will therefore be used only in conjunction with a wobbulation law which introduces only one parasitic line in the frequency zone located beyond the frequency FR/2.

Figure 9:
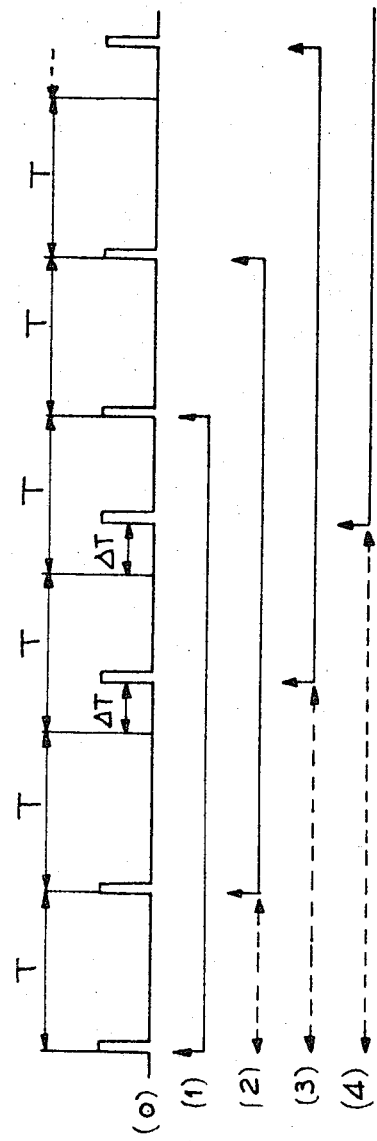

FIG. 9 shows at (0) an example of a wobbulation law which fulfills this condition: T being the interval between the first and the second pulses, $T + \Delta T$ is the interval between the second and third pulses, T between the third and fourth pulses, $T - \Delta T$ between the fourth, $T - \Delta T$ between the fourth and the fifth.

After decomposition into four functions (1), (2), (3), (4) as above, it is found that the three first lines have the vectorial compositions of FIG. 10. It can also be seen that the second line is zero.

The first line may be cancelled by a phase advance of functions (3) and (4), whereby the second line is kept at zero.

The phase correction may be effected either at the transmitter at the transmission frequency, or at the receiver by acting, for example, on the phase of the frequency change wave as shown in FIG 2.

By taking the repetition frequency T, $T + \Delta T$, T, $T - \Delta T$ with $$\frac{\Delta T}{T} = \frac{1}{3}$$

the phase correction to be applied is 30°. The resulting amplitude spectrum is shown in FIG. 11.

This spectrum is no longer symmetrical relative to the continuous component, contrary to what happened in the case of amplitude modulation. The filters will therefore be chosen so that their characteristics do not comprise the parasitic lines.

The additional modulation according to the invention makes thus possible to use frequency wobbulation in Doppler radars without having to cope with the mixture of echoes from fixed and moving targets, which no longer occurs.

Thus, in the case of the two particular examples described above, the amplitude modulation and the phase modulation, the total domain (product of the maximum detection distance without blind zone by the first blind speed) is, respectively, the quadruple and double of the domain of a radar with the same mean repetition frequency, but without wobbulation. All other things being equal, the gain may even be much larger if more complex wobbulation is used.

For a radar whose domain is determined, shorter wavelengths may thus be used, which leads to a substantial reduction in the dimensions of the antenna and to better detection of low-flying targets.

Obviously, the invention is not limited to the embodiments just described and shown merely by way of non-limitative examples.

What is claimed is:

1. A method for improving a pulsed radar system with wobbulated pulse repetition frequency, said method consisting substantially in applying a supplemental modulation according to a modulation law such that at least the first line of the spectrum caused by the wobbulation is cancelled.

2. An improvement to radar systems with wobbulated pulse repetition frequency comprising an intermediate frequency stage and $n$ range gate filters coupled in parallel to said stage, said improvement consisting of an amplitude modulator interposed between said stage and said filters, whose modulation coefficient varies with the pulse repetition rate.

3. An improvement to radar systems with wobbulated pulse repetition frequency comprising an intermediate frequency stage having a local frequency wave input, and a local frequency wave generating circuit coupled to said input, said improvement consisting of phase modulating means interposed between said circuit and said input, whose modulation coefficient varies with the pulse repetition rate.

4. An improvement to radar systems with wobbulated pulse repetition frequency comprising a carrier frequency wave generator, timing means, pulse modulating means coupled to said generator and controlled by said timing means, and radiating means coupled to said pulse modulation means, said improvement consisting of variable coefficient modulating means interposed between said pulse modulating means and said radiating means, and controlled by said timing means.

5. An improvement according to claim 4, wherein said modulation means are phase modulating means.

References Cited

UNITED STATES PATENTS 2,840,808   6/1958   Woodward ............ 343—7.7
2,883,656   4/1959   Russell ............... 343—7.7

RODNEY D. BENNETT, JR., *Primary Examiner.*

CHARLES L. WHITHAM, *Assistant Examiner.*